Figure 5:
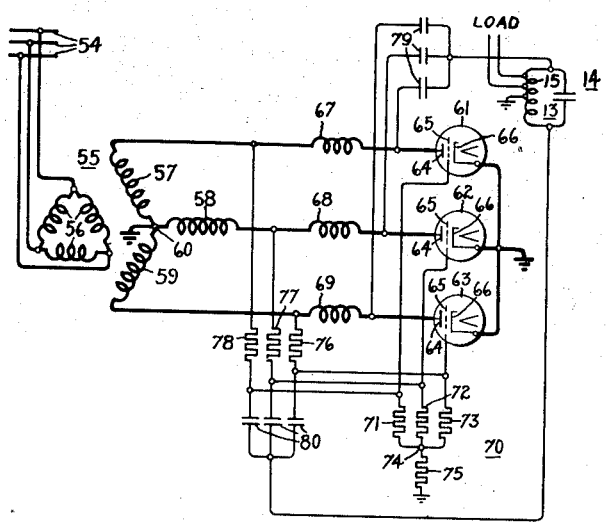

June 30, 1942.       E. D. McARTHUR       2,288,363
ELECTRIC VALVE FREQUENCY CHANGER
Filed April 15, 1941           2 Sheets-Sheet 1
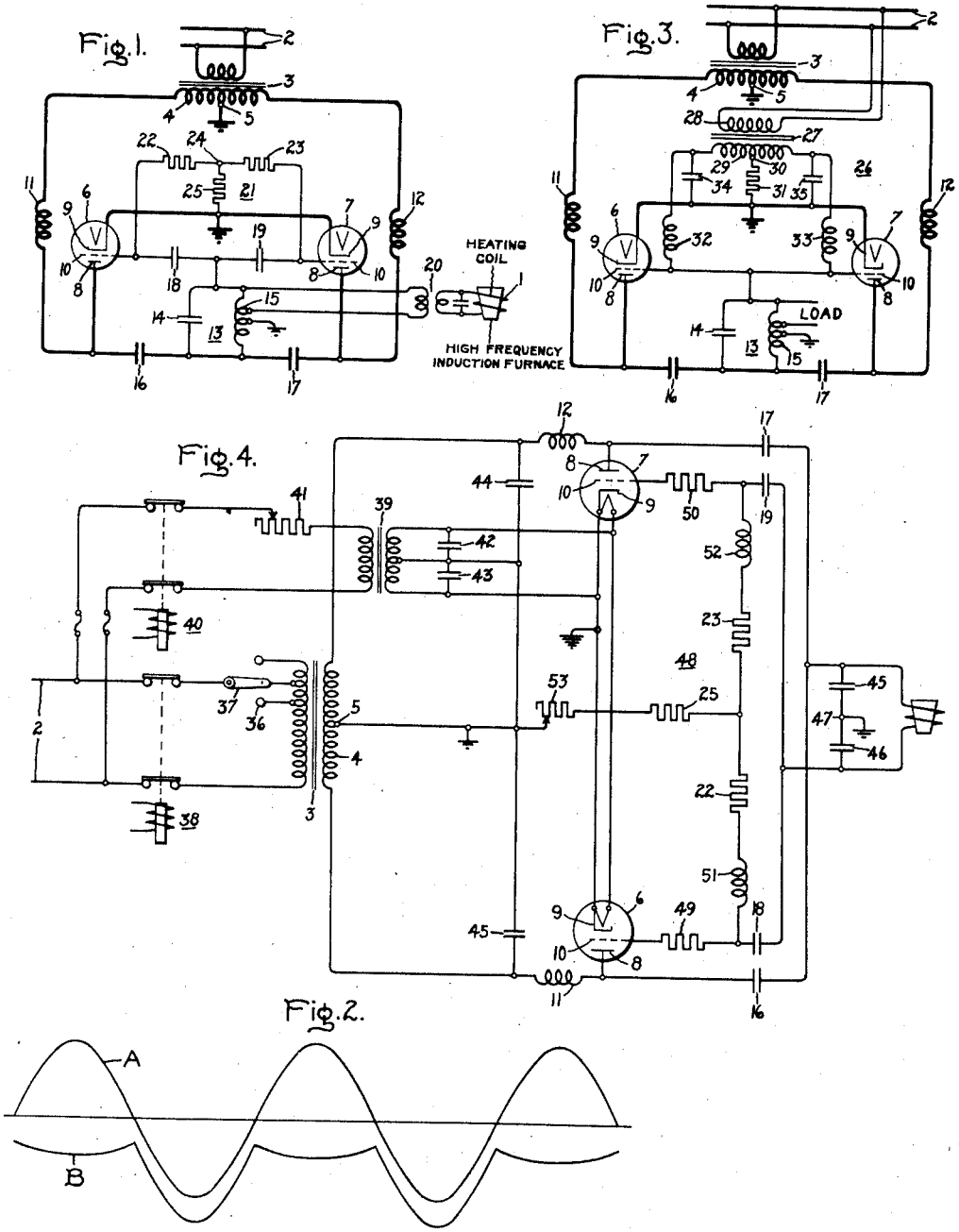
Inventor:
Elmer D. McArthur,
by Harry E. Dunham
His Attorney.

June 30, 1942.  E. D. McARTHUR  2,288,363
ELECTRIC VALVE FREQUENCY CHANGER
Filed April 15, 1941   2 Sheets-Sheet 2

Inventor:
Elmer D. McArthur,
by Harry E. Dunham
His Attorney.

Patented June 30, 1942

2,288,363

UNITED STATES PATENT OFFICE 2,288,363

ELECTRIC VALVE FREQUENCY CHANGER

Elmer D. McArthur, Schenectady, N. Y., assignor to General Electric Company, a corporation of New York Application April 15, 1941, Serial No. 388,703

3 Claims. (Cl. 250—36)

My invention relates to electric valve frequency changers and more particularly to electric valve circuits for generating alternating currents of a frequency relatively high as compared with the frequency of ordinary power circuits.

This application is a continuation-in-part of my application Serial No. 353,133, filed August 17, 1940, and which is assigned to the assignee of the present application.

In certain industrial applications as, for example, in systems for energizing high frequency induction furnaces, it is desirable to employ electric valve apparatus for generating alternating currents having frequencies relatively higher than commercial frequencies, and to derive the energy from alternating current circuits of commercial frequencies. Heretofore, the electric valve frequency changers or oscillator circuits which have operated from commercial alternating current supply circuits have been characterized by certain undesirable features. Among these undesirable features have been the imposition of low power factor conditions, low efficiency and small utilization factor of the electric valve or electronic discharge devices employed, high initial cost and complexity of associated control circuit design. In accordance with the teachings of my invention described hereinafter, I provide new and improved electric valve frequency changer or electric valve oscillator circuits energized from an alternating current source of commercial frequency, and which obviate all of the above-mentioned disadvantages of the prior art arrangements.

It is an object of my invention to provide new and improved electric valve frequency changer circuits.

It is another object of my invention to provide new and improved electric valve frequency changer circuits, which are simple and rugged in construction, for energizing a high frequency load circuit from a source of commercial frequency.

Briefly stated, in the illustrated embodiments of my invention I provide new and improved electric valve frequency changers for energizing a load circuit from an alternating current source of commercial frequency. The system comprises a plurality of electronic discharge devices of the high vacuum type, each including a control member or control grid, and which are connected to operate in conjunction with an oscillatory circuit, or a tank circuit. I provide new and improved control circuits for the electronic discharge devices for use in systems where it is desired to energize a high frequency load circuit from a single phase or polyphase alternating current supply circuit. The control circuits selectively control the magnitude of the negative unidirectional biasing potential which is impressed on the control grids to decrease or limit the grid current during the negative or inverse half cycles of applied anode-cathode voltage. The feature of selectively increasing the magnitude of the negative unidirectional biasing potential during the negative half cycles of applied anode-cathode voltage is described and broadly claimed in my copending application Serial No. 388,702 filed April 15, 1941, and which is assigned to the assignee of the present application. The modifications of my invention disclosed and claimed hereinafter relate to specific control circuits for obtaining this type of control for high frequency electric valve generators. I also provide an arrangement in systems of this nature for controlling the amount of power transmitted to the load circuit.

Figure 6:
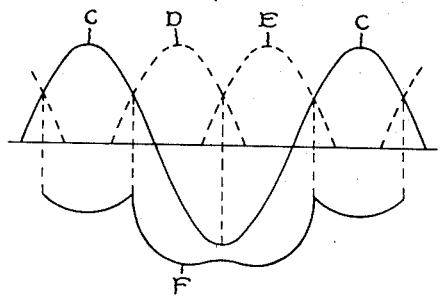

For a better understanding of my invention, reference may be had to the following description taken in connection with the accompanying drawings, and its scope will be pointed out in the appended claims. Fig. 1 of the accompanying drawings diagrammatically illustrate an embodiment of my invention as applied to a system for energizing a high frequency load circuit, such as a high frequency induction furnace, from a single phase alternating current source of a frequency within the range of ordinary commercial frequencies. Fig. 2 represents certain operating characteristics of the arrangement shown in Fig. 1, and Figs. 3 and 4 are modifications of the arrangement shown in Fig. 1. Fig. 5 represents the modification of the embodiment of my invention as applied to a polyphase system, and Fig. 6 represents certain operating characteristics thereof.

Fig. 1 diagrammatically illustrates a modification of my invention as applied to an electronic frequency changer for energizing a high frequency load circuit, such as an induction furnace 1, from a single phase alternating current supply circuit 2 which may be of commercial frequency such as 60 cycles. The system comprises a transformer 3 having a secondary winding 4 provided with an intermediate or neutral connection 5 connected to ground or connected to a point of reference potential. A pair of electronic discharge devices 6 and 7 are arranged to operate with an pull relationship and each is provided with an anode 8, a cathode 9 and a control member or control grid 10. Filtering inductances 11 and 12 are connected in series relation with the associated portions of the secondary winding 4 and electronic discharge devices 6 and 7 to prevent the transmission of high frequency current to transformer 3. The electronic discharge devices 6 and 7 are of the high vacuum type and corresponding principal electrodes, such as cathodes 9, are connected to the point of reference potential or to ground. An oscillatory circuit 13 comprising a capacitance 14 and an inductance 15 is coupled to the anodes 8 of electronic discharge devices 6 and 7 through capacitances 16 and 17. The oscillatory circuit 13 is also coupled to control grids 10 of discharge devices 6 and 7 through capacitances 18 and 19. The load circuit 1, that is the heating coil for the induction furnace, may be energized from the inductance 15 of the oscillatory circuit 13 through an air core transformer 20.

As a means for selectively increasing the biasing potential impressed on control grids 10 during the negative or inverse half cycles of the anode-cathode voltage of discharge devices 6 and 7, I provide a control circuit 21 comprising resistances 22 and 23 having a common connection or juncture 24. The common juncture 24 is connected to the cathodes 9 of electronic discharge devices 6 and 7 through another resistance 25 which is common to the grid circuits for both discharge devices. The control circuit 21 is energized exclusively by grid currents since capacitances 18 and 19 by-pass the high frequency components of current to ground through the upper portion of inductance 15.

The embodiment of my invention shown in Fig. 1 operates to transform the alternating current of commercial frequency, derived from circuit 2, into alternating current of higher frequency. For example, the system may be employed to supply power at substantially 50,000 cycles per second. Electronic discharge devices 6 and 7 conduct low frequency alternating current alternately and during the periods, or intervals of conduction, of low frequency current determined by the voltage of circuit 2. Of course, high frequency excitation is derived from the oscillatory circuit 13 through capacitances 18 and 19 and capacitances 16 and 17.

Control circuit 21 produces unidirectional biasing potentials which selectively increase in magnitude during the negative half cycles of anode-cathode voltage for the respective electronic discharge devices 6 and 7. This selective variation in the magnitude of the biasing potentials is obtained by virtue of the operation of resistances 22 and 23 acting in conjunction with resistance 25. Consider, as an example, one of the electronic discharge devices, such as discharge device 6 when its anode voltage becomes negative. The grid 10 tends to conduct an increased amount of unidirectional current causing an increase in the grid rectification current which flows between grid 10 and the ground connection through resistances 22 and 25 without interfering with the operation of the electronic discharge device 7. In like manner, the biasing potential impressed on grid 10 of electronic discharge device 7 also increases during its inverse or negative half cycles of anode-cathode voltage by the transmission of the grid rectification current through resistance 23 and resistance 25.

It is to be observed that the control circuit 21, including resistances 22, 23 and 25, is energized exclusively by the grid currents. That is, the anode-cathode currents of the electronic discharge devices 6 and 7 are not transmitted through these resistances.

The operation of the embodiment of my invention shown in Fig. 1 may be more fully explained by referring to the operating characteristics shown in Fig. 2 where curve A represents the anode-cathode voltage applied to one of the electronic discharge devices, such as electronic discharge device 6. Curve B represents the variation in magnitude of the negative unidirectional biasing potential produce by control circuit 21. It will be noted that during the negative half cycles the magnitude of the biasing potential increases substantially, thereby limiting or materially reducing the magnitude of the grid current which the electronic discharge device 6 is required to conduct. In like manner, the biasing potential impressed on grid 10 of discharge device 7 also increases during the negative half cycles of its applied low frequency anode-cathode voltage.

The negative biasing potential impressed on control grids 10 of electronic discharge devices 6 and 7 comprises two components due to the fact that resistance 23 is common to the grids of both electronic discharge devices 6 and 7. One component of voltage is that appearing across the terminals of resistance 25 and is due to the sum or average of the grid currents conducted by the grid circuits of electronic discharge devices 6 and 7. The other component of negative biasing voltage is that which is due to either resistance 22 or resistance 23. The components appearing across resistances 22 and 23 vary substantially independently of each other and effect the selective increase in the resultant negative biasing potentials during the respective negative half cycles of applied anode-cathode voltage impressed across electronic discharge devices 6 and 7 by transformer 3.

Fig. 3 diagrammatically illustrates a further single phase modification of my invention for energizing a high frequency load circuit from a source of commercial frequency. In the arrangement of Fig. 3 there is provided a control circuit 26 which impresses on the grids 10 of electronic discharge devices 6 and 7 a component of voltage derived from the supply circuit 2 through a transformer 27 having a primary winding 28 and a secondary winding 29 provided with an intermediate or neutral connection 30. A resistance 31 is connected between the neutral connection 30 and the ground or point of reference potential; and inductances 32 and 33 are connected between the secondary winding 29 and grids 10 to prevent the transmission of the high frequency impulses of circuit 13 to the transformer 27 and resistance 31. Filtering capacitances 34 and 35 are also connected to by-pass the high frequency impulses so that high frequency voltage or current variations are not transmitted to the transformer 27 or resistance 31.

In connection with the embodiment of my invention shown in Fig. 3, it is to be noted that the current transmitted through resistance 31 is exclusively grid current. That is, the anode-cathode currents of the electronic discharge devices 6 and 7 are not transmitted through this resistance.

The embodiment of the invention shown in Fig. 3 operates to limit the grid currents during the negative half cycles of anode-cathode voltage, that is during the negative half cycles of the low frequency component of voltage derived from the supply circuit 2. The low frequency component of voltage introduced into control circuit 26 by means of transformer 27 together with the high frequency excitation operates to impress on the grids 10 of electronic discharge devices 6 and 7 a rectified unidirectional biasing voltage by virtue of the grid rectification characteristics of these electronic discharge devices. The biasing potential appears across the terminals of resistance 31 and the associated portions of secondary winding 29, thereby selectively producing the desired increase in the grid biasing potential at the times when it is desired.

The specific circuit shown in Fig. 3 is disclosed and claimed in my copending patent application Serial No. 440,429, filed April 25, 1942, which is a division of my copending patent application Serial No. 388,702, filed April 15, 1941.

In Fig. 4 there is diagrammatically illustrated another embodiment of my invention which is a modification of the arrangement shown in Fig. 1 and corresponding elements have been assigned like reference numerals. Transformer 3 may be arranged so that the primary winding is provided with a plurality of taps 36 which may be selectively engaged by a switch 37 to control the amount of power transmitted to the high frequency load circuit. Suitable circuit controlling means, such as a contactor 38, may be connected between the alternating current supply circuit 2 and the transformer 3. Current for the cathode heating elements may be supplied through a transformer 39 which may be connected to circuit 2 through a contactor 40 and a voltage controlling resistance 41. Suitable filtering means, such as capacitances 42 and 43, may be connected across the secondary winding of transformer 39 to prevent the transmission of high frequency impulses to the supply circuit 2 or to the transformer 3. In addition, capacitances 44 and 45 may be connected between the inductances 11 and 12 and secondary winding 4 of transformer 3 to serve as a by-pass for the high frequency current so that the high frequency current is not transmitted to the transformer 3 or resistances 22, 23, 25 and 53.

The oscillatory circuit, or the tank circuit, for the system may comprise a pair of capacitances 45 and 46 having the common juncture 47 thereof connected to ground or to the point of reference potential and the inductance of the tank circuit may be furnished by the heating coil of the induction furnace.

I provide a control circuit 48 which impresses on the grids 10 of the electronic discharge devices 6 and 7 negative unidirectional biasing potentials which increase during the negative half cycles of applied anode-cathode voltage in order to decrease or limit the magnitude of the grid currents during the negative half cycles. The circuit includes the common resistance 25 and resistances 22 and 23 which are connected to grids 10 of electronic discharge devices 6 and 7, respectively. Resistances 49 and 50 and inductances 51 and 52 are connected in series relation between resistances 22 and 23 and the control members of electronic discharge devices 6 and 7, respectively. The control circuit 48 is connected to the oscillatory circuit through the coupling capacitances 18 and 19. In order to control the amount of power transmitted to the load circuit, that is the amount of high frequency power transmitted to the heating coil of the induction furnace, I connect in the common connection between the control grids 10 of electronic discharge devices 6 and 7 an adjustable resistance 53. Variation in the magnitude of this resistance controls the magnitude of the negative unidirectional biasing potential and, hence, controls the magnitude of the voltage of the high frequency impulses transmitted to the load circuit. It is to be noted that the common juncture of resistance 53 and capacitances 44 and 45 is connected to ground potential as is the neutral connection 5 of secondary winding 4 of transformer 3.

In Fig. 4, as is true of the embodiments of Figs. 1 and 3, the portions of the control circuit which produce the selective increase in the negative unidirectional biasing potentials are energized exclusively by grid currents and are not connected in the anode-cathode circuits.

The embodiment of my invention shown in Fig. 4 operates to transmit high frequency power to the heating coil of the induction furnace. The electronic discharge devices 6 and 7 conduct current alternately during the respective positive half cycles of applied low frequency anode-cathode voltage determined by the respective associated portions of secondary winding 4 of transformer 3. During each half cycle of conduction, each of the electronic discharge devices, of course, transmits high frequency current the frequency of which is determined by the natural frequency of the oscillatory circuit including capacitances 45 and 46 and the heating coil. The voltage impressed on control grids 10 of electronic discharge devices 6 and 7 comprises two principal components, one of which is the high frequency component of voltage derived from the tank circuit and the other component is the negative unidirectional biasing potential which is selectively increased during the negative half cycles of applied anode-cathode voltage. This negative potential is, of course, produced by the grid rectification characteristic of the electronic discharge devices and is produced by the transmission of current through the impedance elements of the control circuit 48. For example, the biasing potential impressed on grid 10 of electronic discharge device 6 is furnished principally by the voltage drop appearing across resistance 49, inductance 51 and resistances 22, 25 and 53. During the negative half cycles of anode-cathode voltage applied to electronic discharge device 6, the neutral connection 5 of secondary winding 4 is positive in potential relative to the lower terminal of this winding and consequently a negative low frequency current flows through resistance 49, inductance 51 and resistances 22, 25 and 53. This current increases the negative unidirectional biasing potential and consequently tends to limit and substantially reduce the value of the grid current.

It will be observed that the control circuit 48 provides a split circuit for the control grids 10 of electronic discharge devices 6 and 7, certain portions being individual to each of the control members and a certain portion being common to both control grids. This construction or arrangement of the circuit permits the selective increase in the magnitude of the biasing potential for each of the control grids during the negative half cycles of the respective anode-cathode voltage.

The amount of power transmitted to the heating coil of the induction furnace is controllable by means of the resistance 53. Adjustment of this resistance increases the impedance in the common branch of the grid circuits and varies the magnitude of the biasing potentials impressed on grids 19 of electronic discharge devices 6 and 7. If the resistance 53 is adjusted to increase the magnitude of the effective resistance, the biasing potentials are increased and the amount of power transmitted to the heating coil is decreased. Conversely, if the value of resistance 53 is decreased, the value of the biasing potential is decreased and the amount of power transmitted to the heating coil is increased.

Fig. 5 diagrammatically illustrates another embodiment of my invention as applied to an electronic high frequency generator for energizing the high frequency load circuit from a source of polyphase alternating current of commercial frequency, such as an alternating current circuit 54. The system comprises a suitable inductive network, such as a transformer 55, comprising a plurality of primary windings 56 and a plurality of secondary or phase windings 57, 58 and 59 provided with a common juncture or neutral connection 60 which is connected to ground or to a point of reference potential. The system also includes a plurality of electronic discharge devices 61, 62 and 63 of the high vacuum type, each having an anode 64, a control grid 65 and a cathode 66. Principal electrodes of the electronic discharge devices 61—63, such as the cathodes 66, are connected together and to the point of reference potential or to ground. Reactances or inductances 67, 68 and 69 are connected in series relation between phase windings 57—59 and electronic discharge devices 61—63, respectively.

I provide a control circuit 70 which impresses on grids 65 negative unidirectional biasing potentials derived from circuit 54 by virtue of the grid rectification characteristics of the electronic discharge devices 61—63. The control circuit 70 comprises a plurality of individual impedance elements, such as resistances 71, 72 and 73, connected to grids 65 of electronic discharge devices 61—63, respectively, and are arranged to have a common connection 74. I also provide, in circuit 70, a common resistance 75 connected between ground or the point of reference potential and the common connection 74 of resistances 71—73. The unidirectional biasing potentials impressed on grids 65 each comprises two components, one of these components is that which appears across the terminals of resistance 75 and is due to the summation or average of the grid rectification currents of all three electronic discharge devices 61—63, inclusive. The second component is that due to the flow of the individual grid rectification currents through the individual resistances 71—73 in grid circuits of the respective electronic discharge devices.

Control circuit 70 also comprises resistances 76, 77 and 78 which are connected between grids 65 of electronic discharge devices 61—63 and secondary windings 59, 58 and 57, respectively, and which impress low frequency components of voltage on grids 65. The oscillatory circuit, or tank circuit, including capacitance 14 and inductance 15 is coupled to the anodes of the electronic discharge devices 61—63 and to the control circuit 70 through groups of coupling capacitances 79 and 80, respectively.

The manner in which the control circuit 70 of Fig. 5 serves to limit the magnitude of the grid currents during the negative or inverse half cycles of anode-cathode voltage may be more fully appreciated by referring to the operating characteristics shown in Fig. 6. Curves C, D and E represent the respective anode-cathode voltages of electronic discharge devices 61—63, and curve F represents the negative unidirectional biasing potential impressed on the grid of one of the electronic discharge devices, such as electronic discharge device 61. It will be observed that the magnitude of the biasing potential increases substantially during the negative or inverse half cycles. It will be further appreciated that the biasing potentials impressed on grids 65 of electronic discharge devices 62 and 63 will be of the same phase relationship relative to the respective anode-cathode voltages. The increase in the biasing potential impressed on grid 65 of discharge device 61, as illustrated by curve F, is effected by the increase of current which flows through resistance 71. As the anode potential of the electronic discharge device 61 becomes negative relative to its cathode, the grid 65 conducts a greater amount of current effecting an increased potential drop across resistance 71. In this manner circuit 70 tends to limit the grid current by increasing the grid bias voltage selectively for each discharge device as its anode-cathode voltage becomes negative.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In combination, a single phase alternating current supply circuit, a high frequency alternating current load circuit, electric translating apparatus connected between said circuits and comprising an electric oscillator including a pair of electrically displaced windings having a point of reference potential, a pair of electronic discharge devices each connected to a different one of said windings and each including a plurality of principal electrodes, comprising an anode and a cathode, and a control grid and an oscillatory circuit energized by said windings and said electronic discharge devices, corresponding principal electrodes of said discharge devices being connected to said windings and different corresponding principal electrodes being connected directly to said point of reference potential, a control circuit exclusive of the anode-cathode circuits of said electronic discharge devices for selectively increasing the negative biasing potential impressed on said grids during the negative half cycles of voltage of said supply circuit applied between said principal electrodes and comprising a pair of serially connected resistances connected between said grids and having a common juncture and a resistance connected between said juncture and said point of reference potential, and means for coupling said control circuit to said oscillatory circuit.

2. In combination, an alternating current supply circuit, a high frequency alternating current load circuit, electric translating apparatus connected between said circuits and comprising an electric oscillator including a plurality of electrically spaced windings and including a point of reference potential, a plurality of electronic discharge devices each connected to a different one of said windings and each including a plurality of principal electrodes, comprising an anode and a cathode, and a control grid and an oscillatory circuit energized by said windings and said electronic discharge devices, corresponding principal electrodes of said electronic discharge devices being connected to said windings and different corresponding principal electrodes being connected directly to said point of reference potential, a control circuit exclusive of the anode-cathode circuits of said electronic discharge devices for impressing on said grids a biasing potential having a greater negative value during the negative half cycles of voltage of said supply circuit applied between said principal electrodes than that applied during the positive half cycles of voltage of said supply circuit and comprising a plurality of resistances having a common connection and each being connected to a different one of the grids, a resistance connected between said point of reference potential and said common connection, means connected in series relation with the last mentioned resistance for controlling the magnitude of the biasing potential to control the amount of power transmitted to said load circuit, and means for coupling said control circuit to said oscillatory circuit.

3. In combination, a single phase alternating current supply circuit, a high frequency alternating current load circuit, electric translating apparatus connected between said circuits and comprising an electric oscillator including a pair of electrically displaced windings having a point of reference potential, a pair of electronic discharge devices each connected to a different one of said windings and each including a plurality of principal electrodes, comprising an anode and a cathode and a control grid and an oscillatory circuit energized by said windings and said electronic discharge devices, corresponding principal electrodes of said discharge devices being connected to said windings and different corresponding principal electrodes being connected directly to said point of reference potential, a control circuit exclusive of the anode-cathode circuits of said electronic discharge device for selectively increasing the negative biasing potential impressed on said grids during the negative half cycles of voltage of said supply circuit applied between said principal electrodes and comprising a pair of serially connected resistances connected between said grids, said resistances having a common juncture, and means comprising an adjustable resistance connected between said juncture and said point of reference potential for controlling the magnitude of said biasing potential, and means for coupling said control circuit to said oscillatory circuit.

ELMER D. McARTHUR.

CERTIFICATE OF CORRECTION.

Patent No. 2,288,363. June 30, 1942.

ELMER D. McARTHUR.

It is hereby certified that error appears in the printed specification of the above numbered patent requiring correction as follows: Page 1, second column, lines 52 and 53, for "with an pull" read --in push-pull--; and that the said Letters Patent should be read with this correction therein that the same may conform to the record of the case in the Patent Office.

Signed and sealed this 4th day of August, A. D. 1942.

(Seal)

Henry Van Arsdale,
Acting Commissioner of Patents.